(12) United States Patent
Liu et al.

(10) Patent No.: US 7,376,960 B2
(45) Date of Patent: May 20, 2008

(54) COMPACT DISC RECEPTACLE AND COMPACT DISC PROCESSING SYSTEM

(75) Inventors: Ming-Hsun Liu, 10F-6, No. 79, Hsin-Tai-Wu Road, Section 1, Hsi-Chih (TW) 22147; Chung-Hsuan Tsai, Hsi-Chih (TW)

(73) Assignee: Ming-Hsun Liu, Hsi-Chih (TW)

( * ) Notice: Subject to any disclaimer, the term of this patent is extended or adjusted under 35 U.S.C. 154(b) by 483 days.

(21) Appl. No.: 11/161,276

(22) Filed: Jul. 28, 2005

(65) Prior Publication Data

US 2006/0198252 A1    Sep. 7, 2006

Related U.S. Application Data

(63) Continuation-in-part of application No. 11/068,961, filed on Mar. 2, 2005.

(51) Int. Cl.
G11B 17/03 (2006.01)
(52) U.S. Cl. .................................................. 720/603
(58) Field of Classification Search ................ 720/603, 720/601, 616, 622, 704; 206/307.1, 308.1
See application file for complete search history.

(56) References Cited

U.S. PATENT DOCUMENTS

| | | | |
|---|---|---|---|
| 5,481,514 A | 1/1996 | Yamasaki et al. ............ 369/36 |
| 5,793,729 A * | 8/1998 | Soga et al. .................. 720/603 |
| 5,914,918 A | 6/1999 | Lee et al. ...................... 369/34 |
| 5,960,949 A * | 10/1999 | Wynalda, Jr. ............. 206/307.1 |
| 6,052,352 A * | 4/2000 | Liou ........................... 720/603 |
| 6,141,298 A | 10/2000 | Miller ........................... 369/30 |
| 6,473,382 B1* | 10/2002 | Tagawa et al. ............. 720/616 |
| 6,490,232 B2 | 12/2002 | Sato ......................... 369/30.34 |
| 6,496,464 B1* | 12/2002 | Yamauchi et al. .......... 720/622 |
| 6,837,370 B2* | 1/2005 | Shindo et al. ............ 206/308.1 |
| 2005/0022221 A1* | 1/2005 | Inatani et al. ............... 720/704 |

\* cited by examiner

*Primary Examiner*—Tianjie Chen
(74) *Attorney, Agent, or Firm*—Alan Kamrth; Kamrath & Associates PA

(57) ABSTRACT

This invention discloses a compact disc receptacle for containing different sized compact discs. The compact disc receptacle comprises a base having at least a positioning hole seat, and at least a positioning members corresponding to the positioning hole seats. Each positioning member comprises a pivot section for placing into each positioning hole seat respectively, and a positioning wall standing on the pivot section. Each positioning wall have a plurality of positioning edges that can be adapted for setting different sized compact discs by selectively pivoting the positioning members relatively to the compact disc seats.

15 Claims, 4 Drawing Sheets

COMPACT DISC RECEPTACLE AND COMPACT DISC PROCESSING SYSTEM

CROSS-REFERENCE

This application is a continuation-in-part (CIP) of application Ser. No. 11/068,961, filed on Mar. 2, 2005. The prior application is herewith incorporated by reference in its entirety.

BACKGROUND OF THE INVENTION

1. Field of the Invention

The present invention relates to a compact disc receptacle, more particularly, to a compact disc receptacle for containing different sized compact discs, and to a compact disc processing system using the same.

2. Description of the Related Art

Today, compact discs (CDs) have developed in various sizes for different demand. For example, there are standard CDs with 120 mm diameter, mini CDs with 80 mm diameter, and business card CDs in 850 mm×550 mm size or 850 mm×600 mm size with or without curving edges. All of above CDs have to be contained in a CD bin or some CD bins, such as the CD bins disclosed in U.S. Pat. No. 5,914,918. The conventional CD bin can be used for only one size of the CDs.

A compact disc processing system can be used for recording, printing, or verifying compact discs, and can be moved automatically by a transportation device for different processing. In general, it is necessary to have at least one CD bin or receptacle for containing blank or processed CDs. Traditionally, when the conventional CD processing system processes for different sized CDs, it has to change CD bins or receptacles for different sized CDs. It is inefficiency. Thus, it is desirable to provide a CD receptacle for different sized CDs, and to provide a CD processing system having such CD receptacle for different sized CDs for saving time and space for changing different CD receptacles.

All optical compact discs can be reproduced for a small amount or a reasonable amount by a reproduction system, such as the system claimed in U.S. Pat. No. 6,141,298. However, this system requires an enormous amount of space, which is very inconvenient in terms of transportation and operation. Furthermore, due to its complex structure, it also imposes high manufacturing costs.

U.S. Pat. No. 6,490,232 discloses a compact disc feeder, which utilizes a transfer device 6 to drive an arm 12, which moves and rotates to take a disc from a holder 5, and then places it into a tray 49 of a printer 48; then the compact disc which has been printed is drawn from the printer 48 and stacked in a lower holder 5. However, this device still requires large amounts of space.

U.S. Pat. No. 5,481,514 discloses a recording/reproducing apparatus for a disk-like recording medium, which can move between two abreast tray stockers 104, 105 and move one of the tray stocker 104 to a reproduction unit 206, and than back to the tray stocker 105. The two abreast tray stockers 104, 105 still require large amounts of space.

Therefore, it is desirable to provide a CD receptacle and a compact disc processing system to mitigate and/or obviate the aforementioned problems.

SUMMARY OF THE INVENTION

A main objective of the present invention is to provide a compact disc (CD) receptacle and a CD processing system, such as a CD reproduction system, duplication system, printing system, coating system or laminating system for different sized CDs, which also can utilize the top section of the CD processing device for storing CDs to solve problems associated with space.

Another objective of the present invention is to provide a CD receptacle and a CD processing system for different sized CDs, which provides a simple structure to reduce manufacturing costs.

The CD receptacle of this invention comprises: a base having a plurality of positioning hole seats; and a plurality of positioning members corresponding to the positioning hole seats. Each positioning member has a pivot section for placing into each positioning hole seat respectively and a positioning wall standing on the pivot section. Each positioning wall have a plurality of positioning edges for setting different sized CDs by selectively pivoting the plurality of positioning members relatively to the plurality of CD hole seats.

Each pivot section comprises a plurality of indentations for selectively engaging with a bayonet of each positioning hole seat when pivoting.

Each pivot section comprises at least a hook for fastening with an opening of each positioning hole seat.

The CD receptacle further comprises at least a first index marks on the base around the plurality of positioning hole seats separately and at least a second index marks on each pivot section for indicating the different sized CDs by aligning the first with the second index marks when pivoting.

The different sized CDs may be 60 mm radius circle CDs, 40 mm radius circle CDs, or business card CDs. The business card CD may be in size of 850 mm×550 mm or 850 mm×600 mm.

The CD processing system according to the present invention comprises a processing device and a first CD receptacle disposed adjacent to the processing device. The first CD receptacle comprises a base having a plurality of positioning hole seats and a plurality of positioning members corresponding to the plurality of positioning hole seats. Each positioning member has a pivot section for placing into each positioning hole seat respectively and a positioning wall standing on the pivot section. Each positioning wall have a plurality of positioning edges for setting different sized CDs by selectively pivoting the plurality of positioning members relatively to the plurality of CD hole seats.

The processing device comprises a printer, a burner, a recorder, a decoder, a verifier, a reproduction device, or a coating device.

The CD processing system may further comprise a second CD receptacle, wherein the processing device has a top section for placing the second CD receptacle. The second CD receptacle may be same as the first receptacle or may be different from the first receptacle.

The CD processing system further comprises a transportation device for moving at least one of the different sized CDs between the processing device and the first compact disc receptacle. Alternatively, the transportation device may be used for moving the CDs between the processing device and the second CD receptacle or between the first and the second CD receptacles.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
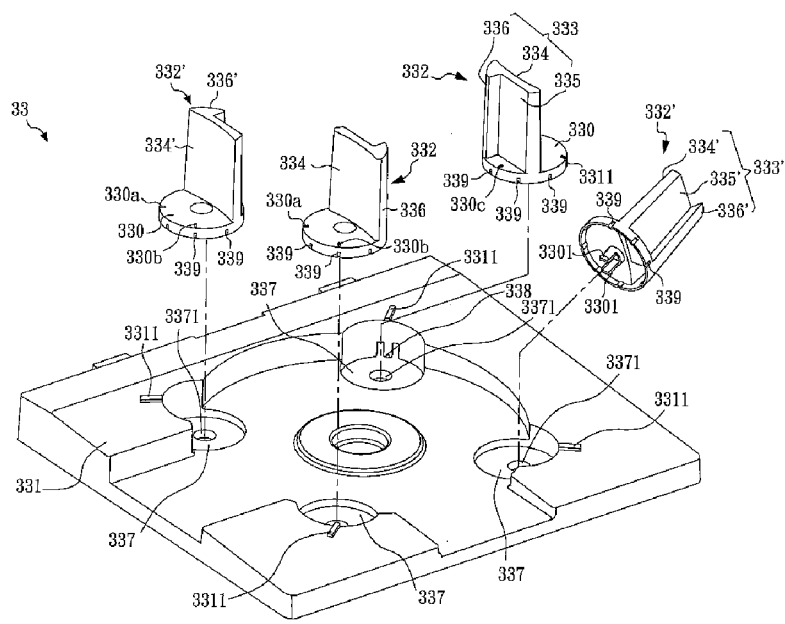
FIG. 1 is an exploded view of a CD receptacle according to the present invention.

Please refer to FIG. 1, which shows an exploded view of a compact disc (CD) receptacle 33 according to the present invention. The CD receptacle 33 comprises a base 331 and a plurality of positioning members 332, 332'. Though, in FIG. 1, there are four positioning members 332, 332' in two pairs, it may be more or less than four positioning members 332, 332' with the same function of positioning for different sized CDs. Each positioning member 332 or 332' comprises a pivot section 330 and positioning wall 333 or 333' standing on the pivot section 330. The base 331 has a plurality of positioning hole seats 337. The number of the positioning hole seats 337 and the positioning members 332, 332' are the same in this preferred embodiment, which is four positioning hole seats 337. Furthermore, the pivot sections 330 of the positioning member 332 or 332' can be placed into the positioning hole seats 337 respectively.

Figure 2A:
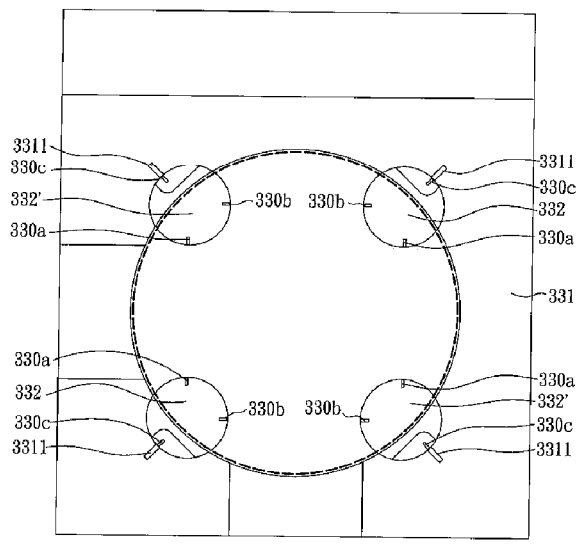
FIG. 2A-2C show top views of the CD receptacle with positioning members in different position by pivoting.
Figure 2B:
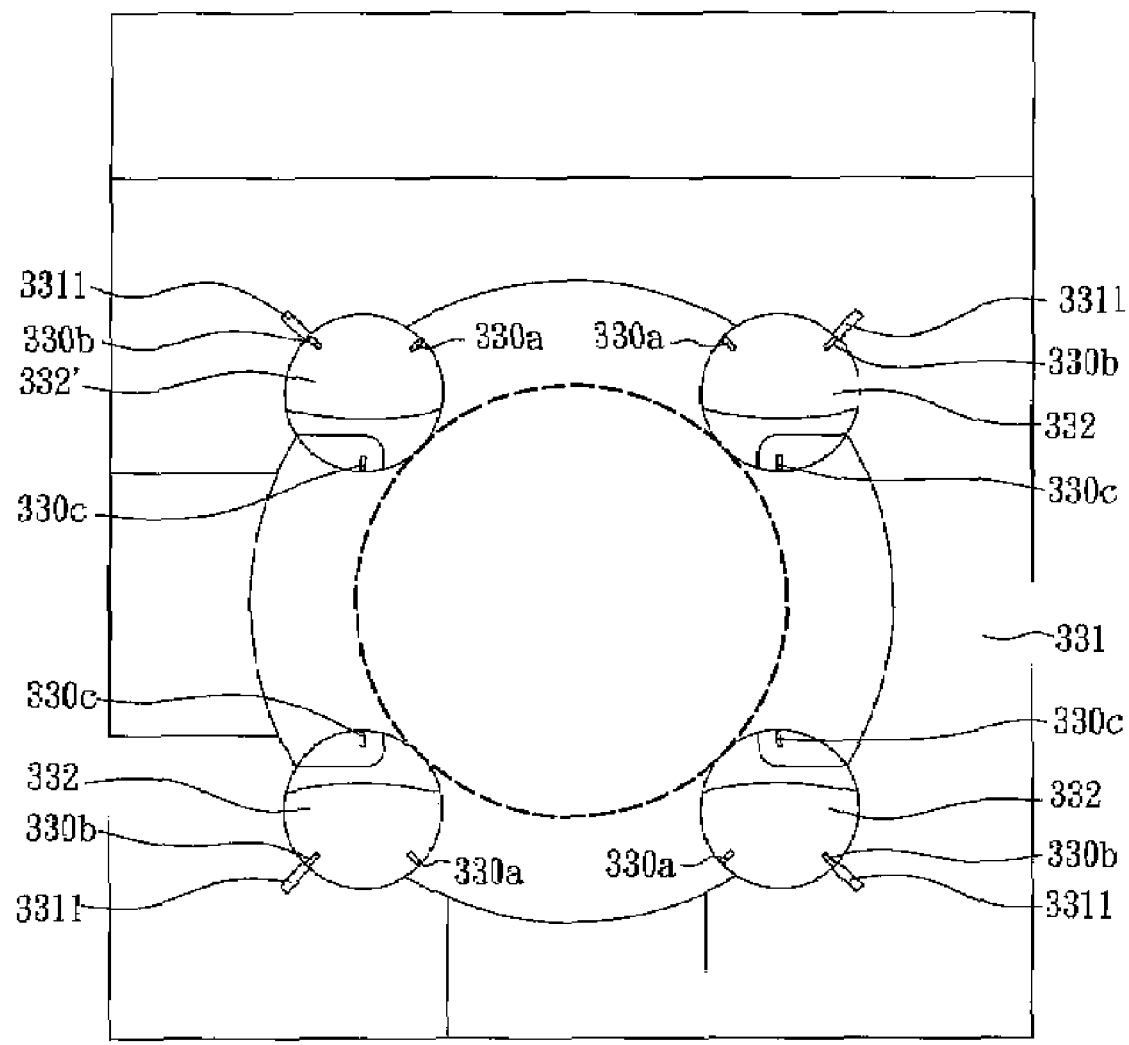
Figure 2C:
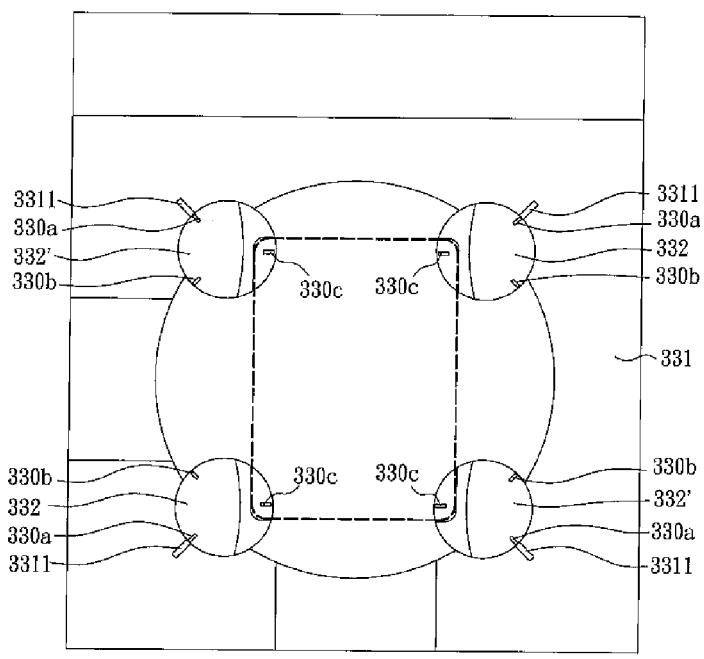

Each positioning wall 333 or 333' have a plurality of positioning edges 334, 335, 336, or 334', 335', 336' for setting different sized CDs, such as 60 mm radius circle CDs, 40 mm radius circle CDs, or business card CDs in 850 mm×550 mm size or 850 mm×600 mm size with or without curving edges, by selectively pivoting the plurality of positioning members 332 or 332' relatively to the plurality of positioning hole seats 337, as shown in FIG. 2A-2C.

The CD receptacle 33 further comprises at least a first index marks 331*l* on the base 331 located around the plurality of positioning hole seats 337, respectively, and at least a second index marks 330a, 330b, 330c marking on each pivot section 330 for indicating the different sized CDs by aligning the first index marks 331*l* with the second index marks 330a, 330b, or 330c when selectively pivoting the positioning members 332, 332'.

That is, for example, referring to FIG. 2A, when the CD receptacle 33 is utilized for receiving 60 mm radius circle CDs, the positioning members 332, 332' can be selectively pivoted for aligning the second index marks 330c with the first index marks 331*l*. Thus, the 60 mm radius circle CDs (as shown in FIG. 2A with the dot line) can be placed into the CD receptacle 33 of the present invention. In addition, the 60 mm radius circle CDs can be fixed by the positioning edges 334, 334' (referring to FIG. 1).

Alternatively, when the CD receptacle 33 is used for receiving 40 mm radius circle CDs (as shown in FIG. 2B with the dot line) the positioning members 332, 332' can also be placed into the CD receptacle 33 by pivoting the positioning members 332, 332' to align the second index marks 330b with the first index marks 331*l*. The 40 mm radius circle CDs can be fixed by the positioning edges 336, 336' (referring to FIG. 1).

In addition, the CD receptacle 33 can be used for receiving business card CDs (as shown in FIG. 2C with the dot line) by pivoting the positioning members 332, 332' to align the second index marks 330c with the first index marks 331*l*. The business card CDs can be fixed by the positioning edges 335, 335' (referring to FIG. 1).

Please refer to FIG. 1. Each pivot section 330 comprises a plurality of indentations 339 for selectively engaging with a bayonet 338 of each positioning hole seat 337 when pivoting the positioning member 332 or 332'. Preferably, each pivot section 330 may comprise at least a hook 3301 for fastening with an opening 3371 of each positioning hole seat 337. Accordingly, when each pivot section 330 is placed into each positioning hole seat 337, the hooks 3301 can be used to fix the positioning members 332, 332' onto the positioning hole seats 337.

Figure 3A:
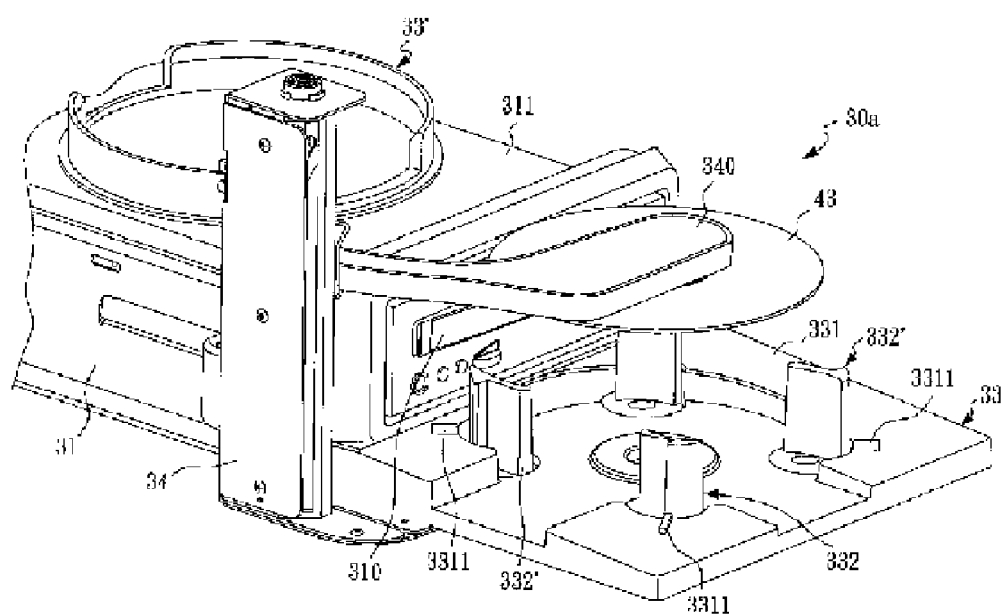
FIG. 3A is a perspective view of the CD processing system according to the present invention.
Figure 3B:
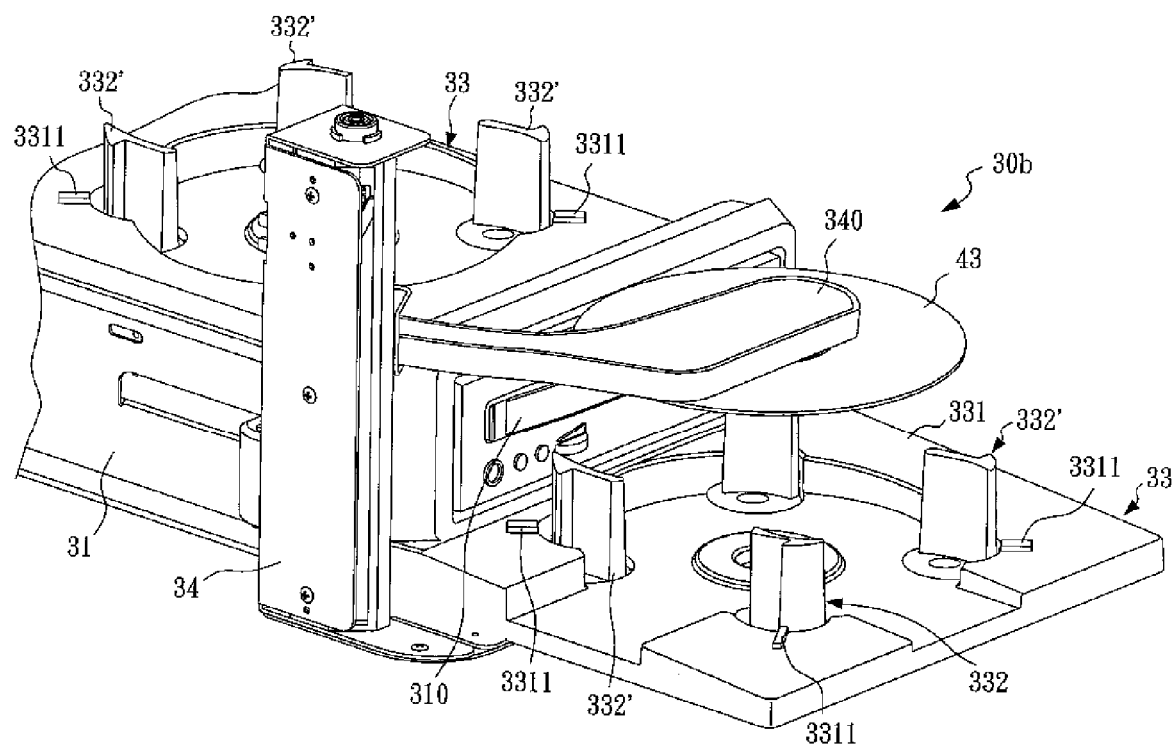
FIG. 3B is a perspective view of another embodiment of the CD processing system according to the present invention.

In addition, the aforementioned CD receptacle 33 can be used in a CD processing system 30a or 30b, as shown in FIG. 3A or FIG. 3B. One embodiment of the present invention is the CD processing system 30a or 30b. The CD processing system 30a, as shown in FIG. 3A, comprises a processing device 31, a first CD receptacle 33 disposed adjacent to the processing device 31. The processing device 31 has a top section 311 for disposing a second CD receptacle 33'. The processing device 31 may be a printer, a burner, a recorder, a decoder, a verifier, a reproduction device, or a coating device, which can be used for different function of processing on CDs.

The first CD receptacle 33 of the processing system 30a or 30b is same as above description, as shown in FIG. 1. The second CD receptacle 33' can be different from the first CD receptacle 33, which can be a traditional CD receptacle. Alternatively, as shown in the FIG. 3B, the second CD receptacle 33' can be substantially same as the first CD receptacle 33.

In addition, the processing system 30a or 30b further comprise a transportation device 34 having a movable arm 340 for moving the CD 43. Traditionally, the processing device 31 has at least a disc tray 310 that can be moved out and in automatically (not shown). Though we have shown only one disc tray 310 in the FIG. 3A and FIG. 3B, it should be understood that the processing device 31 could comprise more of the disc tray 310 (not shown) for different processing. Thus, according to this invention, the transportation device 34 can be used to move the CD 43 between the first CD receptacle 33 and the disc tray 310 of the processing device 31, or, between the disc tray 310 and the second receptacle 33 or 33'.

According to the CD receptacle 33 of this invention, it may be adapted to receive different sized CDs by pivoting the positioning members 332, 332'. Therefore, the processing system 30a or 30b of this invention may be used to process different sized CDs for printing, recording, burning (writing/rewriting), decoding, verifying, coating, reproducing, or the like.

Although the present invention has been explained in relation to its preferred embodiment, it is to be understood that many other possible modifications and variations can be made without departing from the spirit and scope of the invention as hereinafter claimed.

What is claimed is:

1. A compact disc receptacle comprising:
   a base having a plurality of positioning hole seats; and
   a plurality of positioning members corresponding to the plurality of positioning hole seats, each positioning member having a pivot section for placing into each positioning hole seat respectively and a positioning wall standing on the pivot section;
   wherein each positioning wall has a plurality of positioning edges for setting different sized compact discs by selectively pivoting the plurality of positioning members relatively to the plurality of compact disc hole seats.

2. The compact disc receptacle as claimed in claim 1, wherein each pivot section comprises a plurality of indentations for selectively engaging with a bayonet of each positioning hole seat when pivoting.

3. The compact disc receptacle as claimed in claim 1, wherein each pivot section comprises at least a hook for fastening with an opening of each positioning hole seat.

4. The compact disc receptacle as claimed in claim 1 further comprising at least a first index marks separately located on the base around the plurality of positioning hole seats and at least a second index marks located on each pivot section for indicating the different sized compact discs by aligning the first index marks with the second index marks when pivoting.

5. The compact disc receptacle as claimed in claim 1, wherein the different sized compact discs comprise 60 mm radius circle compact discs, 40 mm radius circle compact discs, or business card compact discs.

6. A compact disc processing system comprising:
a processing device; and
a first compact disc receptacle disposed adjacent to the processing device, the first compact disc receptacle comprising:
a base having a plurality of positioning hole seats; and
a plurality of positioning members corresponding to the positioning hole seats, each positioning member having a pivot section for placing into each positioning hole seat respectively and a positioning wall standing on the pivot section;
wherein each positioning wall have a plurality of positioning edges for setting different sized compact discs by selectively pivoting the plurality of positioning members relatively to the plurality of compact disc hole seats.

7. The compact disc processing system as claimed in claim 6, wherein the processing device comprises a printer, a burner, a recorder, a decoder, a verifier, a reproduction device, or a coating device.

8. The compact disc processing system as claimed in claim 6 comprising a second compact disc receptacle, wherein the processing device has a top section for disposing the second compact disc receptacle.

9. The compact disc processing system as claimed in claim 8 comprising a transportation device for moving at least one of the different sized compact discs between the first and the second compact disc receptacle or between the processing device and the second compact disc receptacle.

10. The compact disc processing system as claimed in claim 8, wherein the second compact disc receptacle comprises:
a base having a plurality of positioning hole seats; and
a plurality of positioning members corresponding to the plurality of positioning hole seats, each positioning member having a pivot section for placing into each positioning hole seat respectively and a positioning wall standing on the pivot section;
wherein each positioning wall have a plurality of positioning edges for setting different sized compact discs by selectively pivoting the plurality of positioning members relatively to the plurality of compact disc hole seats.

11. The compact disc processing system as claimed in claim 6 comprising a transportation device for moving at least one of the different sized compact disc between the processing device and the first compact disc receptacle.

12. The compact disc processing system as claimed in claim 6, wherein each pivot section comprises a plurality of indentations for selectively engaging with a bayonet of each positioning hole seat when pivoting.

13. The compact disc processing system as claimed in claim 6, wherein each pivot section comprises at least a hook for fastening with an opening of each positioning hole seat.

14. The compact disc processing system as claimed in claim 6 further comprising at least a first index marks on the base around the plurality of positioning hole seats separately and at least a second index marks on each pivot section for indicating the different sized compact discs by aligning the first with the second index marks when pivoting.

15. The compact disc processing system as claimed in claim 6, wherein the different sized compact discs comprise 60 mm radius circle compact discs, 40 mm radius circle compact discs, or business card compact discs.

* * * * *